United States Patent
Gally

(10) Patent No.: US 8,094,362 B2
(45) Date of Patent: Jan. 10, 2012

(54) METHOD AND SYSTEM FOR COLOR OPTIMIZATION IN A DISPLAY

(75) Inventor: Brian Gally, Los Gatos, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 0 days.

(21) Appl. No.: 12/973,612

(22) Filed: Dec. 20, 2010

(65) Prior Publication Data

US 2011/0090136 A1 Apr. 21, 2011

Related U.S. Application Data

(63) Continuation of application No. 11/036,966, filed on Jan. 14, 2005, now Pat. No. 7,855,824.

(60) Provisional application No. 60/550,687, filed on Mar. 6, 2004.

(51) Int. Cl.
G02B 26/00 (2006.01)
G09G 5/10 (2006.01)
(52) U.S. Cl. .................................... 359/290; 345/690
(58) Field of Classification Search .............. 345/690; 359/290
See application file for complete search history.

(56) References Cited

U.S. PATENT DOCUMENTS

| | | |
|---|---|---|
| 2,677,714 A | 5/1954 | Max |
| 3,247,392 A | 4/1966 | Thelen |
| 3,656,836 A | 4/1972 | de Cremoux et al. |
| 4,200,472 A | 4/1980 | Chappell |
| 4,400,577 A | 8/1983 | Spear |
| 4,403,248 A | 9/1983 | Te Velde |
| 4,441,789 A | 4/1984 | Pohlack |
| 4,459,182 A | 7/1984 | Te Velde |
| 4,633,031 A | 12/1986 | Todorof |
| 4,705,361 A | 11/1987 | Frazier et al. |
| 4,786,128 A | 11/1988 | Birnbach |
| 4,822,993 A | 4/1989 | Dillon et al. |
| 5,151,585 A | 9/1992 | Seibert |
| 5,356,488 A | 10/1994 | Hezel |
| 5,500,761 A | 3/1996 | Goosen et al. |
| 5,751,492 A | 5/1998 | Meyers |
| 5,782,995 A | 7/1998 | Nanya et al. |
| 5,886,688 A | 3/1999 | Fifield |
| 5,914,804 A | 6/1999 | Goossen |

(Continued)

FOREIGN PATENT DOCUMENTS

CA 2 490 975 1/2004

(Continued)

OTHER PUBLICATIONS

Chemical Properties Handbook, McGraw-Hill, 1999, Refractive Index, Dipole Moment and Radius of Gyration; Inorganic Compounds, No. 151: O2Si.

(Continued)

*Primary Examiner* — Amr Awad
*Assistant Examiner* — Waseem Moorad
(74) *Attorney, Agent, or Firm* — Knobbe, Martens, Olson & Bear LLP

(57) ABSTRACT

Disclosed herein are iMoD displays optimized by utilizing different materials for one or more different color subpixels. Such optimized displays have improved color gamut over displays where all subpixels are constructed with the same material. Also disclosed are methods for manufacturing such displays and methods for optimizing iMoD displays.

5 Claims, 9 Drawing Sheets

U.S. PATENT DOCUMENTS

| | | | |
|---|---|---|---|
| 5,986,796 A * | 11/1999 | Miles | 359/260 |
| 6,300,558 B1 | 10/2001 | Takamoto | |
| 6,323,987 B1 | 11/2001 | Rinuado | |
| 6,411,423 B2 | 6/2002 | Ham | |
| 6,520,643 B1 | 2/2003 | Holman et al. | |
| 6,760,146 B2 | 7/2004 | Ikeda et al. | |
| 6,871,982 B2 | 3/2005 | Holman et al. | |
| 7,099,058 B2 | 8/2006 | Takemori et al. | |
| 7,138,984 B1 | 11/2006 | Miles | |
| 7,187,489 B2 | 3/2007 | Miles | |
| 7,210,806 B2 | 5/2007 | Holman | |
| 7,324,248 B2 | 1/2008 | Brotherton-Ratcliffe et al. | |
| 7,385,748 B2 | 6/2008 | Miles | |
| 7,400,439 B2 | 7/2008 | Holman | |
| 7,417,735 B2 | 8/2008 | Cummings | |
| 7,498,621 B2 | 3/2009 | Seitz | |
| 7,520,642 B2 | 4/2009 | Holman et al. | |
| 7,603,001 B2 | 10/2009 | Wang | |
| 7,630,123 B2 | 12/2009 | Kothari | |
| 7,643,203 B2 | 1/2010 | Gousev et al. | |
| 7,701,029 B2 | 4/2010 | Mabuchi | |
| 7,719,500 B2 | 5/2010 | Chui | |
| 7,750,886 B2 | 7/2010 | Sampsell | |
| 7,807,488 B2 | 10/2010 | Gally | |
| 7,855,824 B2 | 12/2010 | Gally | |
| 7,898,521 B2 | 3/2011 | Gally | |
| 7,907,319 B2 | 3/2011 | Miles | |
| 7,911,428 B2 | 3/2011 | Gally | |
| 7,928,928 B2 | 4/2011 | Gally | |
| 2001/0019240 A1 | 9/2001 | Takahashi | |
| 2002/0050286 A1 | 5/2002 | Kubato | |
| 2002/0115215 A1* | 8/2002 | Wolffe et al. | 435/455 |
| 2003/0006730 A1 | 1/2003 | Tachibana | |
| 2003/0213514 A1 | 11/2003 | Ortabasi | |
| 2004/0070569 A1 | 4/2004 | Muthuswamy | |
| 2004/0188599 A1 | 9/2004 | Viktorovitch | |
| 2004/0217264 A1 | 11/2004 | Wood | |
| 2005/0117623 A1 | 6/2005 | Shchukin | |
| 2006/0130889 A1 | 6/2006 | Li | |
| 2007/0092728 A1 | 4/2007 | Ouderkirk et al. | |
| 2007/0195392 A1 | 8/2007 | Phillips et al. | |
| 2007/0206267 A1 | 9/2007 | Tung | |
| 2009/0086301 A1 | 4/2009 | Gally | |
| 2009/0101192 A1 | 4/2009 | Kothari | |
| 2009/0151771 A1 | 6/2009 | Kothari | |
| 2009/0242024 A1 | 10/2009 | Kothari | |
| 2009/0293955 A1 | 12/2009 | Kothari | |
| 2010/0096006 A1 | 4/2010 | Griffiths | |
| 2010/0096011 A1 | 4/2010 | Griffiths | |
| 2010/0165443 A1 | 7/2010 | Chui | |
| 2010/0214642 A1 | 8/2010 | Miles | |
| 2010/0245370 A1 | 9/2010 | Narayanan | |
| 2010/0245975 A1 | 9/2010 | Cummings | |
| 2011/0043889 A1 | 2/2011 | Mignard | |

FOREIGN PATENT DOCUMENTS

| | | |
|---|---|---|
| DE | 102 28 946 | 1/2004 |
| DE | 103 29 917 A1 | 2/2005 |
| EP | 0 223 136 A | 5/1987 |
| EP | 1 670 065 A | 6/2006 |
| EP | 2 051 124 A | 4/2009 |
| GB | 2 315 356 | 1/1998 |
| JP | 02-151079 A | 6/1990 |
| JP | 03-199920 | 8/1991 |
| JP | 04-238321 A | 8/1992 |
| JP | 05 281479 | 10/1993 |
| JP | 11 064882 | 3/1999 |
| JP | 11-295726 A | 10/1999 |
| JP | 2001-345458 | 12/2001 |
| JP | 2002 328313 | 11/2002 |
| JP | 2005-308871 | 11/2005 |
| KR | 2003-0081662 A | 10/2003 |
| WO | WO 97/44707 A | 11/1997 |
| WO | WO 97/46908 | 12/1997 |

OTHER PUBLICATIONS

Lau "Infrared characterization for microelectronics" New Jersey: World Scientific, Oct. 1999, pp. 55-71, ISBN 981-02-2352-8.

Nakagawa et al. "Wide-Field-of-View Narrow-Band Spectral Filters Based on Photonic Crystal Nanocavities", Optical Society of America, Optics Letters, vol. 27, No. 3, pp. 191-193, 2002.

Non-Final Rejection in U.S. Appl. No. 11/036,966, dated Oct. 3, 2008.

Response after Non-Final Action and Information Disclosure Statement (IDS) in U.S. Appl. No. 11/036,966, dated Feb. 2, 2009.

Final Rejection in U.S. Appl. No. 11/036,966, dated May 6, 2009.

Request for Continued Examination (RCE), Amendment, and Information Disclosure Statement (IDS) in U.S. Appl. No. 11/036,966, dated Aug. 4, 2009.

Non-Final Rejection in U.S. Appl. No. 11/036,966, dated Oct. 7, 2009.

Examiner Interview Summary in U.S. Appl. No. 11/036,966, dated Dec. 30, 2009.

Response after Non-Final Action and Applicant Interview Summary in U.S. Appl. No. 11/036,966, dated Jan. 7, 2010.

Notice of Allowance and Examiner Interview Summary Record in U.S. Appl. No. 11/036,966, dated Apr. 7, 2010.

Request for Continued Examination (RCE) and Information Disclosure Statement (IDS) in U.S. Appl. No. 11/036,966, dated Jul. 2, 2010.

Notice of Allowance in U.S. Appl. No. 11/036,966, dated Aug. 11, 2010.

* cited by examiner

US 8,094,362 B2

METHOD AND SYSTEM FOR COLOR OPTIMIZATION IN A DISPLAY

CROSS-REFERENCE TO RELATED APPLICATION

This application is a continuation of U.S. application Ser. No. 11/036,966, entitled "Method and System for Color Optimization in a Display," filed Jan. 14, 2005, which claims priority to U.S. Provisional Application No. 60/550,687, entitled "Method for Optimizing Color in IMOD Displays," filed Mar. 6, 2004, both of which are incorporated herein by reference in its entirety.

BACKGROUND

1. Field of the Invention

This invention relates to interferometric modulators (iMoDs). More particularly embodiments of this invention relate to optimizing color in iMoD displays.

2. Description of the Related Art

To reach broad market acceptance, a display technology must be capable of providing the end-user with a satisfying visual experience. The market for high brightness, low power displays continues to expand with the constant introduction of new portable electronic devices. Conventional wisdom suggests that reflective displays are unable to provide the requisite image quality for broad market acceptance. For example, reflective liquid crystal displays (LCDs) suffer from insufficient reflectance for office use without supplemental illumination and insufficient color gamut under conditions of bright sunlight. As a result, recent marketplace developments have shifted the dominant display for small mobile device applications from reflective to transflective LC displays. The increased brightness and color gamut of transflective displays comes at the price of increased power consumption due to the near constant requirement for supplemental illumination, increased manufacturing complexity and increased costs.

SUMMARY

One aspect of the present invention is a display comprising a plurality of pixels, where each pixel comprises a plurality of subpixels and each subpixel is selected from a plurality of subpixel types and where each pixel comprises at least two subpixels that are of differing subpixel type. Each subpixel type forms an interference modulator that is adapted to reflect light of a different color than other subpixel types. The interference modulator of at least one subpixel type includes at least one difference in its interference modulator components compared to interference modulator components of at least one other subpixel type.

Another aspect of the present invention is a method of manufacturing a display comprising manufacturing an array of interference modulator structures on a substrate so as to generate at least two interference modulator structures having at least one difference in their interference modulator components. Each interference modulator structure is adapted to produce a respective color.

Still another aspect of the present invention is a method of optimizing a display where the color display comprises an array of interference modulator structures and each of the interference modulator structures are capable of reflecting light of a particular color selected from a group of colors. The optimization method comprises selecting materials for use in the interference modulator structures, selecting the thickness of the materials, and selecting the interference modulators' gap independently for each color in the group of colors.

DETAILED DESCRIPTION OF PREFERRED EMBODIMENTS

An alternative to reflective or transflective LCDs are displays based on iMoDs. In one embodiment, an iMoD reflective display is provided that comprises at least two different color subpixels. The color subpixels are optimized so that the iMoD display produces a desired color gamut. Color optimization may be accomplished by choosing the materials of components, positioning of components, and thicknesses of components independently for each subpixel. Independent color optimization of subpixels allows the manufacture of displays having a wider color gamut than would be available if iMoDs having the same structure were used for all of the subpixels. Furthermore, color optimization provides iMoD displays having a wider color gamut than available in LCDs.

Figure 1:
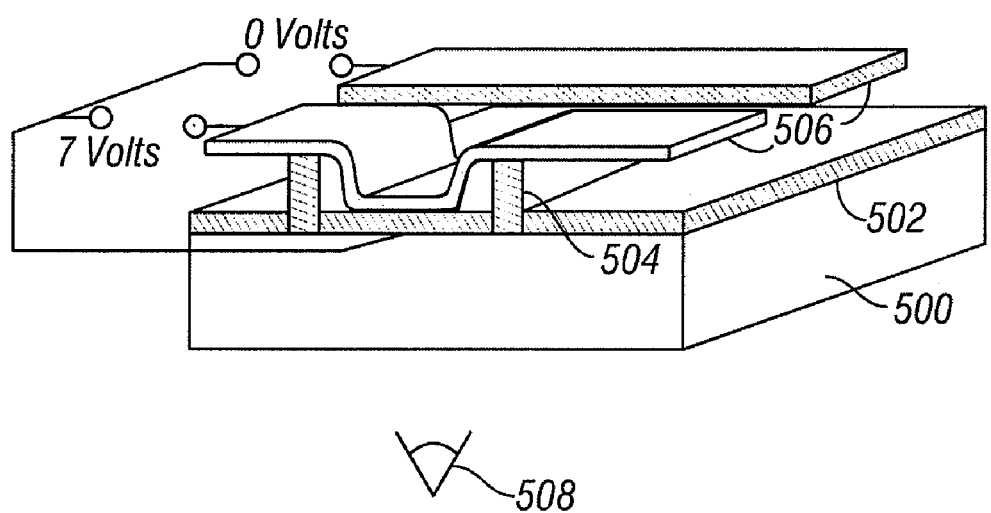
FIG. 1 depicts an iMoD structure.

A basic iMoD structure is depicted, for example, in FIG. 1. A conductive partially reflective mirror 502 is deposited unto transparent substrate 500. Support structures 504 on substrate 500 support movable conductive mirror 506. Reflection from mirrors 502 and 506 can be observed from view position 508. In an undriven state, a gap is formed between movable mirror 506 and partially reflective mirror 502. When a sufficient voltage is applied across movable mirror 506 and partially reflective mirror 502, movable mirror 506 collapses, closing the gap. Thus, for example, FIG. 1 depicts movable mirror 506 in the collapsed state when a voltage of 7 volts is applied between the movable mirror 506 and the partial reflector 502. Those of skill in the art will recognize that voltages other than 7 volts may be effective in collapsing movable mirror 506. In contrast, when 0 volts are applied, FIG. 1 illustrates that there is a gap between movable mirror 506 and partial reflector 502. The reflective spectral characteristics of the iMoD are dependent upon the optical path length between the movable mirror 506 and partial reflector 502, which depends on the size of the air gap and the thickness and index of refraction of any material disposed between the movable mirror 506 and partial reflector 502. In some embodiments, the partially reflective mirror is coated with a dielectric layer such that shorting of the movable mirror to the partially reflective mirror is prevented when the movable mirror collapses. The thickness of the dielectric can also determine the reflective spectral characteristics of the collapsed iMoD. Additional information on iMoD structures can be found in U.S. Pat. Nos. 5,835,255; 5,986,796; 6,040,937; 6,055,090; 6,574,033; 6,589,625; 6,650,455; 6,674,562; 6,680,792; 6,710,908; 6,741,377; and 6,794,119.

As will be apparent from the following description, the invention may be implemented in any device that is configured to display an image, whether in motion (e.g., video) or stationary (e.g., still image), and whether textual or pictorial. More particularly, it is contemplated that the invention may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures (e.g., tile layouts), packaging, and aesthetic structures (e.g., display of images on a piece of jewelry). More generally, the invention may be implemented in electronic switching devices.

Figure 2:
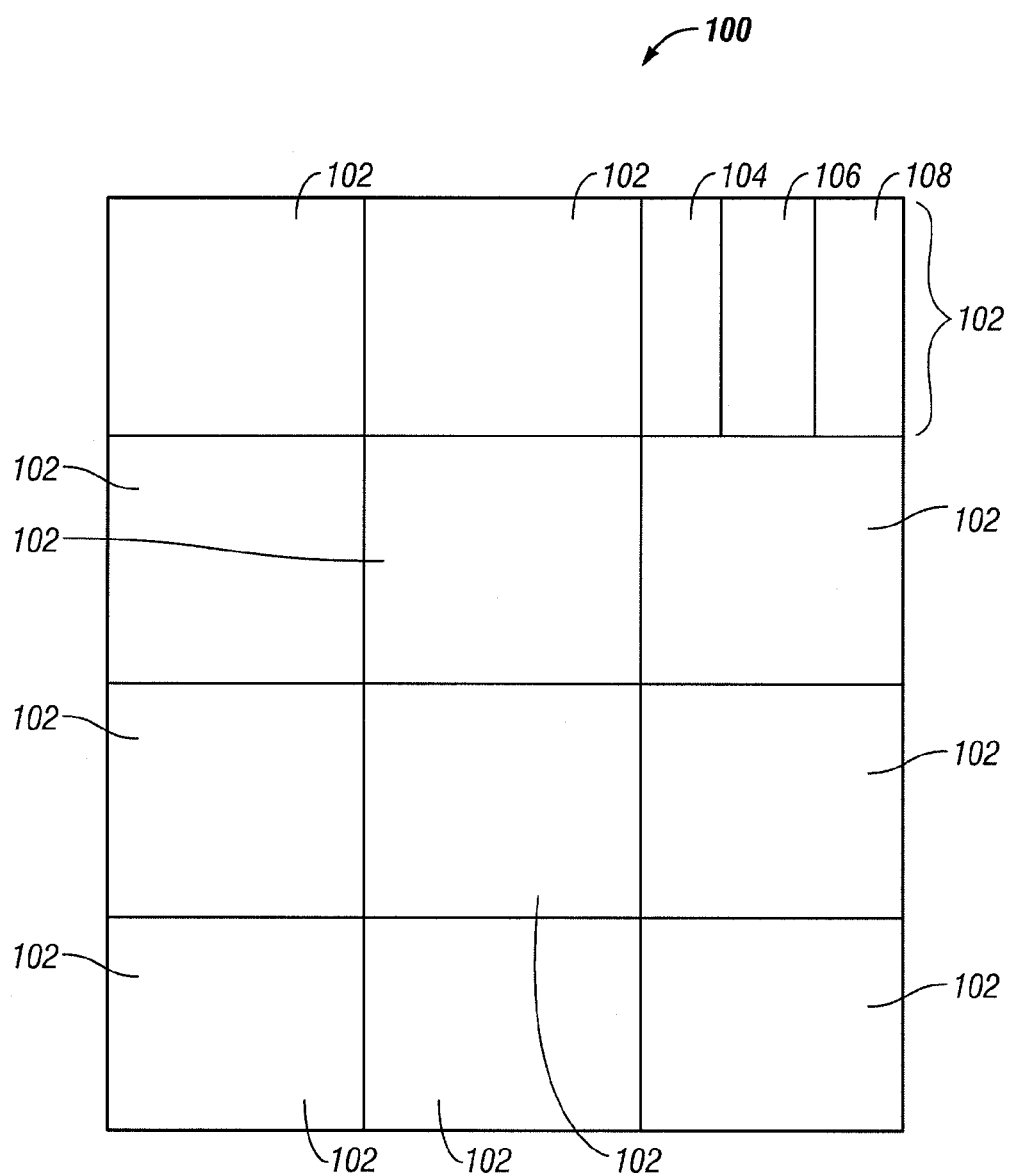
FIG. 2 depicts an iMoD display consisting of pixels and subpixels.

As described above, the gap between the partially reflective mirror 502 and the movable mirror 506 determines the hue of light reflected from an iMoD by setting the difference in optical path length between light reflected by the two mirrors. As used herein, "hue" refers to the color perceived by a human observer of the reflected light. The resulting constructive interference generates color from each iMoD. FIG. 2 depicts one embodiment of a color iMoD display 100. The iMoD display 100 may be constructed by manufacturing an array of iMoD structures. The structures may be grouped into an array of pixels 102. Each pixel in the display comprises three iMoD structures, 104, 106, and 108, referred to as "subpixels." The gap in each subpixel, 104, 106, or 108, is set so that the subpixel is capable of reflecting light in one of three primary colors. Thus, each subpixel, 104, 106, or 108 may be of a different "subpixel type." This gap is set during the manufacturing process by depositing a sacrificial layer between the partial reflector 502 and the movable mirror 506 (see FIG. 1), which is ultimately removed during a final 'release' etch process. Thus, the gap is designed into the display 100 during fabrication by setting the parameters of the deposition process of the sacrificial material. In some embodiments, each iMoD element 104, 106, or 108, operates as a binary device, switching between a bright state and a dark state. The hue generated by a particular pixel 102 will be determined by which subpixel(s) 104, 106, or 108, in the pixel 102 are in a bright state.

Alternatively, a monochrome iMoD display may be provided that includes two or more subpixels types. For example, a cyan subpixel type and a yellow subpixel type may be provided to produce a white color by the combination of the cyan and yellow colors. In one embodiment, a monochrome iMoD display is provided that comprises a single subpixel type, such as a green subpixel type.

In some embodiments, each pixel 102 comprises more than three subpixels. In one embodiment, the additional subpixels may be adapted to generate additional colors, thus providing additional subpixel types. In another embodiment, the additional subpixels may be adapted to generate the same three primary colors. Thus, in this embodiment, the relative intensity of each primary color reflected by a pixel may be determined by how many subpixels of that primary color are in a bright state.

Since the thickness of the sacrificial layer partially determines the color of iMoD elements, the possible set of generated colors is large. In addition, the particular set of colors available to be manufactured into an iMoD depends on the characteristics of the material used in the iMoD structure and the thickness of the materials used. For example, the material used for the movable mirror 506 may absorb certain wavelengths of light, thus affecting the possible reflected colors. Similarly, the spectral absorption/reflection properties of the materials used for the partial reflector 502, dielectric layers, and substrate 500 may affect the set of colors available to be manufactured into an iMoD.

Figure 3A:
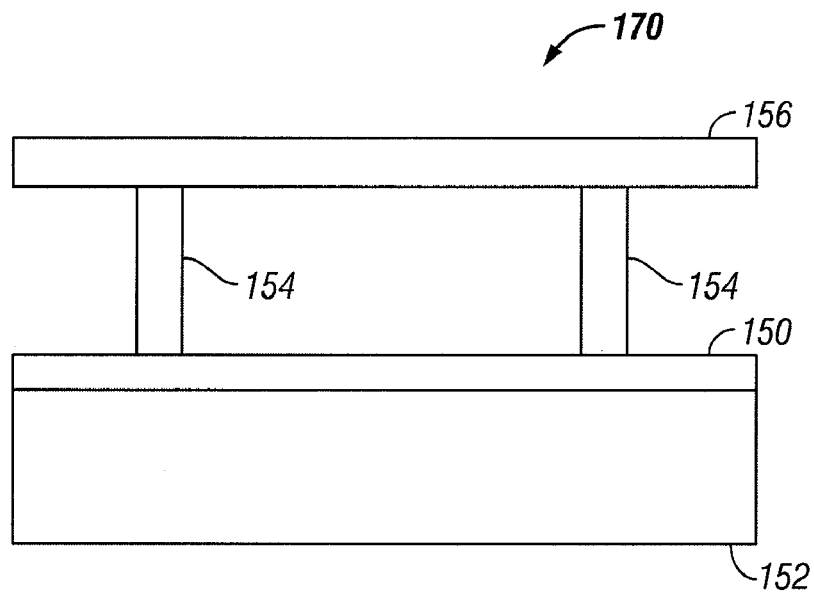
FIGS. 3A and 3B depict two iMoD structures where the structure of FIG. 3B contains an additional gold film.
Figure 3B:
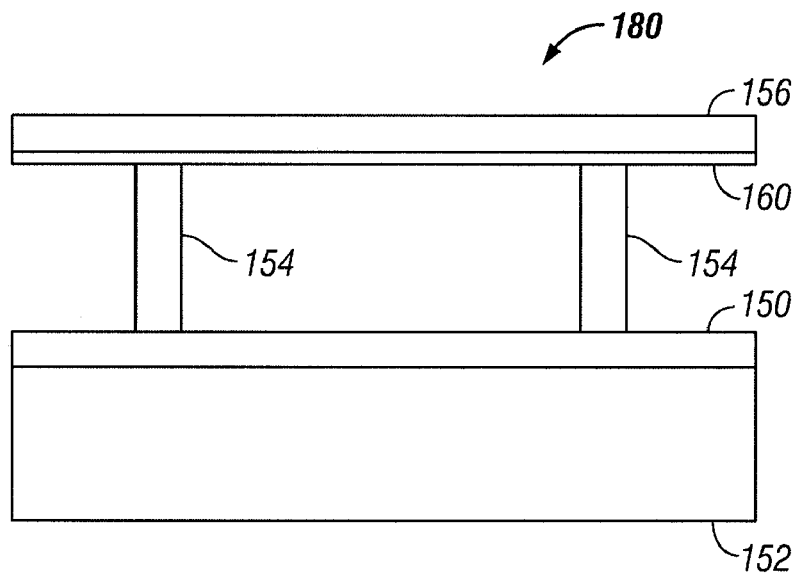

One example of iMoD structures consisting of different materials is depicted in FIGS. 3A and 3B. FIG. 3A depicts an iMoD structure 170 similar to that depicted in FIG. 1. A partial reflector 150 is deposited onto a substrate 152. Support structures 154 support a movable mirror 156. In one embodiment, movable mirror 156 comprises aluminum, which is advantageous due to its high reflectivity, low cost, and ease of deposition. The iMoD structure of FIG. 3A will be referred to hereinafter as "iMoD structure A." FIG. 3B depicts an iMoD structure 180 that has been modified by depositing an additional gold layer 160 on the aluminum movable mirror 156. The iMoD structure of FIG. 3B will be referred to hereinafter as "iMoD structure B." The gold layer 160 may be deposited by metallic thin film layer deposition in an additional lithography step prior to deposition and patterning of the aluminum layer 156. One of skill in the art will recognize that alternative materials may be used to achieve the same result. For example, movable mirror 156 may be constructed of high reflectivity materials other than aluminum. Furthermore, the iMoD structure B may be constructed by making the entire movable mirror 156 from gold rather than by adding the additional gold layer 160 to aluminum.

As demonstrated below, the gold layer 160 improves the red subpixels because it absorbs blue light. Alternative metals such as copper may be used to achieve a similar result. The absorption of blue light enables the use of more effective iMoD gap distances. Each iMoD gap distance is capable of providing constructive interference for light reflected at wavelengths corresponding to integer multiples of twice the gap distance. Thus, several wavelengths of light may be reflected corresponding to first order interference (wavelength=2×gap), second order interference (wavelength=gap), and so on. As discussed below, it is advantageous to use red subpixels with an iMoD gap distance tuned to reflect red light through second order interference. However, such gap distances also reflect blue light through third order interference, inhibiting practical use of these red subpixel types when only an aluminum movable mirror 156 is used. However, when the third order blue light is absorbed by gold layer 160, the iMoD gap distances that produce second order red light may be used.

Alternatively, absorption of blue light may be accomplished by including certain oxides that absorb blue light, such as HfO, in the iMoD structure. For example, the oxides may be deposited onto the substrate as part of the iMoD structure of the red subpixels. The oxide layers are advantageously transparent, thus acting as a filter for blue light while letting light of other wavelengths proceed into the iMoD structure. It will be appreciated that reflectors and absorbers that absorb light at wavelengths other than blue may be similarly used to optimize subpixels of colors other than red.

Figure 4:
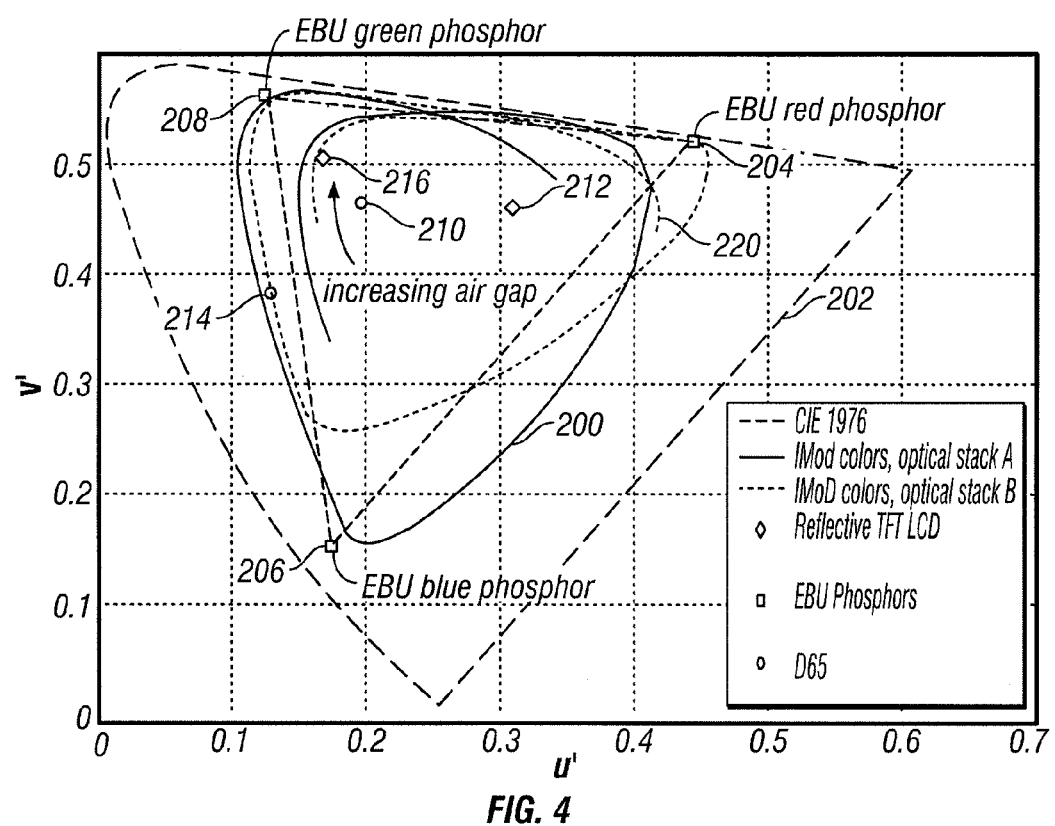
FIG. 4 shows a CIE color space plot of the color space available for two iMoD structures constructed with different materials.

The color perceived from an iMoD subpixel (i.e., the hue) may expressed in terms of CIE tri-stimulus color parameters. CIE tri-stimulus parameters and methods for obtaining them are well known in the art. In various embodiments, these parameters may be expressed as X, Y, and Z values; x, y, and z values; Y, x, and y values; Y, u', and v' values; as well as any other color parameters known in the art. In some embodiments, color parameter pairs such as (x,y) or (u',v') may be used to graphically depict a given perceived color (i.e., hue) on a two-dimensional CIE color space plot. FIG. 4 shows a (u',v') CIE color space plot with the possible set of colors that can be generated using either iMoD structure A 170 or iMoD structure B 180. The solid curve 200 in FIG. 4 shows the possible set of colors that can be generated using iMoD structure A 170. Each point on the curve 200 represents the color generated by iMoD structure A 170 having a particular gap distance between the partial reflector 150 and the movable mirror 156. The gap distance increases moving clockwise around the curve 200. In one embodiment, each iMoD is capable of generating only one color, but that color can come from any point along the curve shown in FIG. 4. In this way, curve 200 represents the color design space from which the colors of the red, green, and blue primary colors are chosen and the corresponding gap distances of the subpixels 104 determined (see FIG. 2). Curve 200 shows that changing the thickness of the gap over a sufficient range can vary not only the hue but also the saturation (defined herein as the purity of the desired primary color hues) of the resulting colors. The more saturated colors are the result of second order constructive interference between the partial reflector and the movable mirror. FIG. 4 also indicates the color parameters for the limit of human perception as defined by the CIE 1976 color standard (long dashed line 202); red 204, blue 206, and green 208 EBU phosphor color standards (squares); a D65 white light source 210 (circle); and the primary colors typically used for the subpixels of a reflective TFT LCD display 212, 214, and 216 (diamonds).

To maximize the compatibility of iMoD fabrication with the existing LCD manufacturing infrastructure, certain iMoD designs may utilize only those materials widely used by the LCD industry, such as aluminum for the movable mirror 156. Furthermore, to reduce costs and employ the simplest process, identical iMoD structures may be employed for all three primary colors. In some embodiments of the present invention, alternative materials are used in constructing iMoD subpixels in order to provide alternative color space options. A non-limiting example is the utilization of gold layer 160 in iMoD structure B 180. In addition, in some embodiments, not all subpixels may be constructed of the same materials, allowing greater flexibility in color optimization. For example, in one embodiment, red subpixels are manufactured according to iMoD structure B 180 while blue and green subpixels are manufactures according to iMoD structure A 170.

Modifications to the thicknesses or materials comprising the components making up an iMoD can result in alternative color design spaces. The short-dashed curve 220 in FIG. 4 shows a set of design colors that can be generated by iMoD structure B 180. As in curve 200 for iMoD structure A 170, each point on the curve 220 represents the color generated by an iMoD structure B iMoD 180 having a particular air gap. The air gap increases moving clockwise around the curve 220. It can be seen that the addition of gold layer 160 in iMoD structure B 180 results in the accessibility of different (u',v') color parameters than are accessible by iMoD structure A 170. In particular, iMoD structure B 180 can be tuned to obtain color parameters near the EBU red phosphor 204 that are unavailable to iMoD structure A 170.

The design of an ideal display requires the balancing of image quality parameters such as color gamut, brightness, and contrast. As used herein, "color gamut" refers the range of perceived colors that can be produced by a given display; "brightness" refers to the perceived amount of light reflected by a given display; and "contrast" refers to the perceived distinguishability between bright state reflectance and dark state reflectance. In some cases, "color gamut" may be quantified by the area of the triangle in a CIE color space plot whose vertices are defined by the (u',v') color parameters for the red, blue, and green subpixels, respectively. In some cases, "color gamut" may be compared to the color gamut generated by the EBU red 204, blue 206, and green 208 phosphors. This comparison may be quantified as a ratio of the area of the triangle in a CIE color space plot whose vertices are defined by the (u',v') color parameters for the red, blue, and green subpixels and the area of the triangle in the CIE color space plot whose vertices are defined by the EBU red 204, blue 206, and green 208 phosphors. In some cases, "contrast" may be quantified as the ratio of bright state reflectance to dark state reflectance, both measured under conditions of diffuse illumination.

Figure 5:
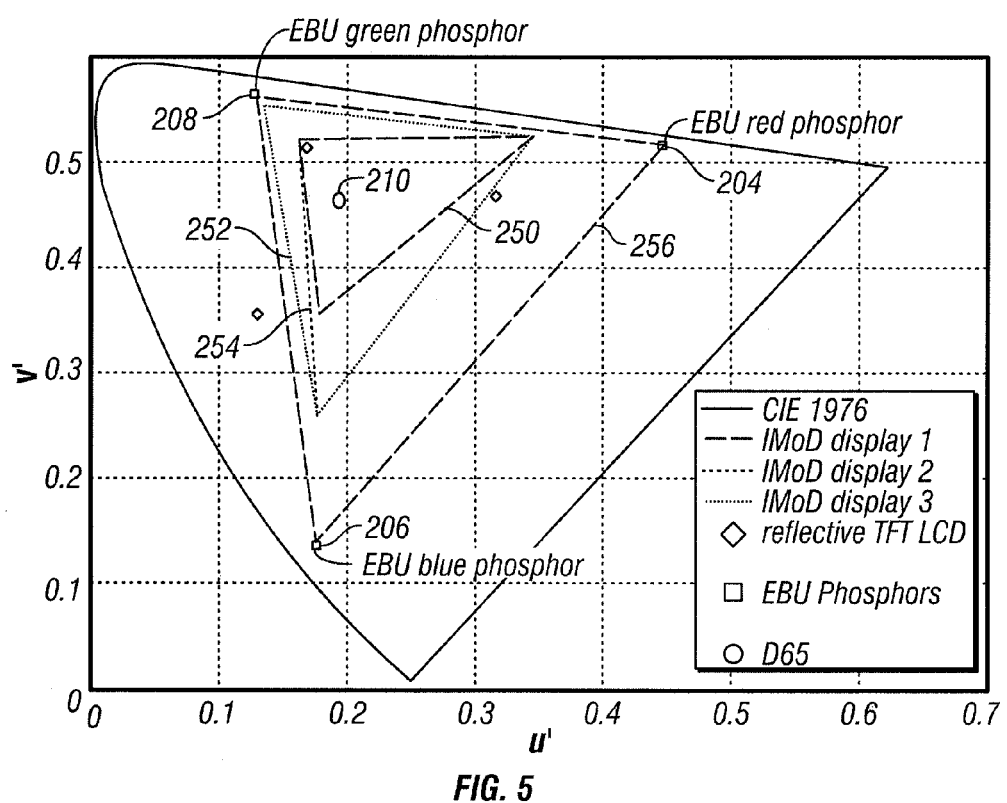
FIG. 5 shows a CIE color space plot of the color parameters and color gamut for three iMoD color displays having subpixels constructed with the same material.

The unique ability to adjust color in a continuous way affords iMoD displays wide latitude in performing optimization of color gamut, brightness, and contrast. For example, by choosing various combinations of air gap sizes for iMoD subpixles, multiple color displays can be constructed using the same iMoD structure design. FIG. 5 shows a CIE (u',v') color space plot of three iMoD displays constructed using iMoD structure A 170. The three displays are illustrated by triangles in the CIE color space plot where the (u',v') color parameters of the primary color subpixels for each display define the vertices of the triangles. iMoD display 1 250 maximizes the reflectance of the display at the cost of color gamut, iMoD display 3 252 maximizes the color gamut at the cost of reflectance, while iMoD display 2 254 represents a compromise between these competing parameters. The color gamut generated by EBU red 204, blue 206, and green 208 phosphors is also represented by triangle 256.

Table 1 lists various image quality parameters for iMoD display 1 250, iMoD display 2 254, and iMoD display 3 252. The reflectance ratio, defined as the percent of light reflected from the display, provides an indication of the relative brightness of the displays. The contrast ratio indicates the contrast between bright and dark reflection. The color gamut for the three displays is expressed as a percent of the color gamut generated when using EBU red 204, blue 206, and green 208 phosphors (note the relative size of the triangles in the color space plot of FIG. 5 for iMoD display 1 250, iMoD display 2 254, and iMoD display 3 252 as compared to color gamut 256 generated by the EBU phosphors). Table 1 also lists the (u',v') color parameters for the red, green, and blue subpixels chosen for iMoD display 1 250, iMoD display 2 254, and iMoD display 3 252 as well as the respective projected white color parameters. These results show the tradeoff between the color gamut and the brightness and contrast of a reflective display with iMoD display 1 250 having the highest reflectance and contrast ratio while iMoD display 3 252 has the highest color gamut.

TABLE 1

Image quality parameters for iMoD displays 1-3, using iMoD structure A.

| Parameter | | | iMoD display 1 | iMoD display 2 | iMoD display 3 |
|---|---|---|---|---|---|
| Reflectance ratio (%) | | | 30 | 26 | 20 |
| Contrast ratio (x:1) | | | 19 | 17 | 12 |
| Color gamut (% of EBU) | | | 22 | 36 | 46 |
| Pixel pitch (mm) | | | 0.231 | 0.231 | 0.231 |
| Color chromaticity | White | u' | 0.196 | 0.198 | 0.196 |
| | | v' | 0.470 | 0.469 | 0.467 |
| | Red | u' | 0.346 | 0.347 | 0.349 |
| | | v' | 0.528 | 0.528 | 0.528 |
| | Green | u' | 0.162 | 0.161 | 0.134 |
| | | v' | 0.522 | 0.522 | 0.554 |
| | Blue | u' | 0.178 | 0.178 | 0.178 |
| | | v' | 0.364 | 0.272 | 0.269 |

The color gamut results in Table 1 also show that iMoD displays are fully capable of generating a wide color gamut relative to typical reflective LCDs. All of the parameters in Table 1 are determined for conditions of diffuse illumination, with reflectance measured 8 degrees from the normal to the display. This measurement technique is recommended by the VESA measurement standards for reflective displays (see VESA, Flat Panel Display Measurements Standard, Version 2.0, 2001, Video Electronics Standards Association). Measuring display performance under diffuse illumination is representative of actual ambient viewing conditions.

Under conditions of diffuse illumination, iMoD displays can be twice as bright as typical reflective LCDs while providing a larger color gamut. Alternatively, iMoD displays can be designed to provide a color gamut commensurate with that of transflective LCDs while in transmissive mode, all the while maintaining a reflectance greater than that of purely reflective LCDs. These specifications exemplify the inherent flexibility iMoD displays have in tailoring performance to each application. iMoD displays can address the need for low cost, single iMoD structure high reflectance displays (displays 1 250 and 2 254 of FIG. 5) as well as the broader market for larger color gamut, high reflectance displays (display 3 252 of FIG. 5).

In one embodiment, the color in an iMoD display 100 consisting of subpixels 104, 106, and 108 constructed using identical iMoD structure materials (i.e., the only difference between the subpixel types is the gap between the movable mirror 506 and the partial reflector 502) is optimized to produce the desired characteristics (with references to FIGS. 1 and 2). For example, to provide a white point equivalent to a standard D65 white light source 210 (with reference to FIGS. 4 and 5), a balance exists between the selection of the green and red primary colors. To maintain a green hue close to that of the EBU green phosphor 208, the hue of the red primary may be shifted towards green. Alternatively, the red primary is set at a hue close to that of the red EBU phosphor 204, at the price of shifting the green primary towards red. Once the primary colors are chosen, additional fine tuning of the white point and reflectance may be achieved by adjusting the area ratio of the three primary colors, for example by introducing multiple subpixels of the same type (color). These choices of primary colors and area ratios affect the overall brightness of the display 100. In one embodiment, in order to maximize the brightness of the display 100, the green primary is set and the red primary is shifted towards green.

Increasing the Color Gamut by Combining Different iMoD Structures

Figure 6:
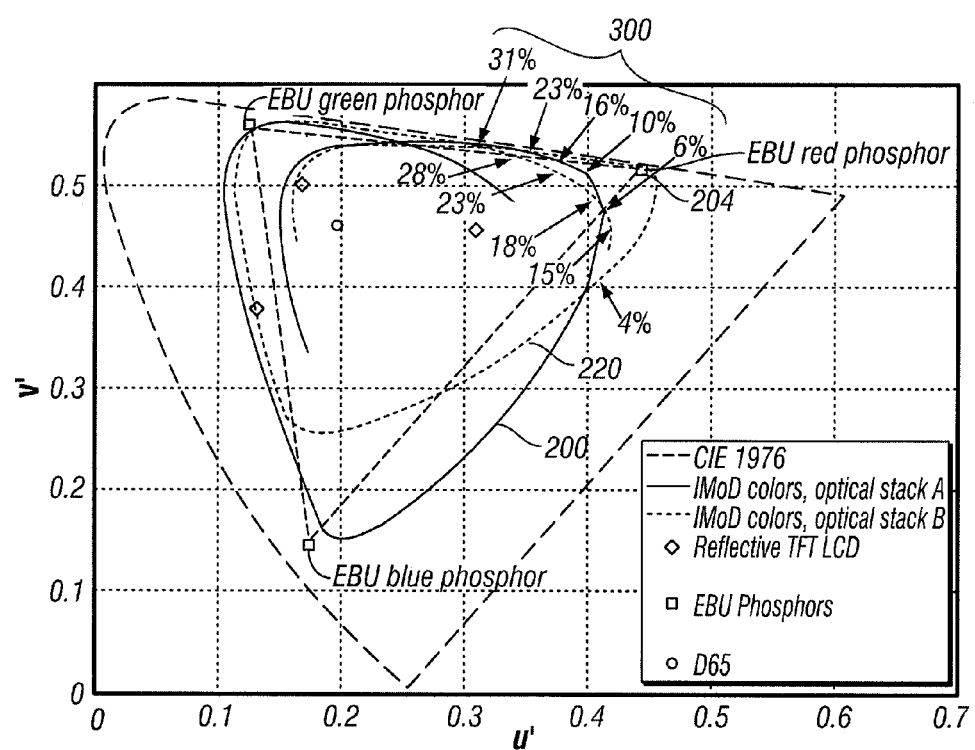
FIG. 6 shows the CIE color space of FIG. 4 with reflectance values as a function of color for two iMoD structures constructed with different materials.

The requirement of a balanced white point limits the choice of the red primary color in the previous examples. While the iMoD is capable of producing red colors with a deeper, redder hue, these redder hues have a limited brightness. FIG. 6 shows a CIE color space plot of the possible sets of color parameters that can be obtained from iMoDs constructed according to iMoD structure A 170 and iMoD structure B 180 (with reference to FIGS. 3A and 3B). FIG. 6 is the same plot as in FIG. 4 except that reflectance values 300 for iMoDs having selected color parameters in the red region are indicated on the curves for iMoD structure A 200 and iMoD structure B 220. The reflectance for various red subpixel choices using either iMoD structure A 170 or iMoD structure B 180 is indicated. When increasing the air gap in iMoD structure A 170 (i.e., moving clockwise around curve 200), the reflectance falls substantially before the hue of the red EBU phosphor 240 is reached. However, increasing the air gap in iMoD structure B 180 (i.e., moving clockwise around curve 220) exhibits an alternative behavior, one in which the brightness of the red hue is maintained until the hue moves through the red shades and into the magenta and purple shades where the response of the eye is more limited.

While a single iMoD structure is capable of generating the high level of performance specified in Table 1, additional gains are possible. By combining primary colors from the color curve 200 (for iMoD structure A 170) and the color curve 220 (for iMoD structure B 180) shown in FIGS. 4 and 6 into one display, improvements in display image quality performance are possible. This results in improvements in the color gamut, reflectance and contrast ratio, while maintaining full control over the white point of the display.

Thus, in some embodiments, color displays (such as display 100 in FIG. 2) are provided consisting of a plurality of iMoD structure subpixels (such as subpixels 104, 106, and 108 in FIG. 2) where at least one of the iMoD structure subpixels consists of an iMoD structure that is different from the iMoD structures of the other subpixels. Non-limiting examples of differences in the iMoD structures include a difference in material chosen for one of the iMoD structure components, the addition or removal of a component, altering the thickness of a component in the iMoD structure, and/or a different order of components. Non-limiting examples of components in the iMoD structure that can be altered include the movable mirror 506, the partial reflector 502, dielectric layers, and the transparent substrate 500.

In some embodiments, a monochrome display whose bright state color is determined by the combination of two or more subpixels may be optimized for the monochrome color. For example, a monochrome white display may comprise a cyan subpixel and a yellow subpixel whose combined colors produce white. The cyan and yellow subpixels may be independently optimized as described herein in order to produce an optimized white color.

In some embodiments, a monochrome display comprises a single color subpixel, however, that color subpixel is optimized as described herein in order to produce a specific desired color. Similarly, in some embodiments, a single color subpixel or multiple color subpixels are optimized in a color display so that the display is capable of producing a specific desired color with high quality. Thus, in some embodiments, color optimization is performed to achieve results other than just a wide color gamut.

In cases where additional material is included in some iMoD structures, the additional material may comprise any material that has reflection and/or absorption properties that enhance or suppress desired wavelengths of light. The material may be metallic or non-metallic.

In some embodiments, differences in iMoD iMoD structures can be achieved by including additional deposition, patterning, and/or material removal steps. For example, to include an additional film (such as film 160 in FIG. 3B) on the reflective side of the movable mirror 156, the film 160 may be deposited prior to deposition of the movable mirror material 156. Lithographic patterning may then define which iMoD structures within the display are to receive the additional film 160 (e.g., which of subpixels 104, 106, and 108 in FIG. 2 are to receive the additional film). The movable mirror material 156 may then be deposited followed by etching to remove the additional film 156 on selected iMoD structures. In some embodiments, the additional film 156 may be removed during the same "release" etch that removes the sacrificial layer.

Figure 7:
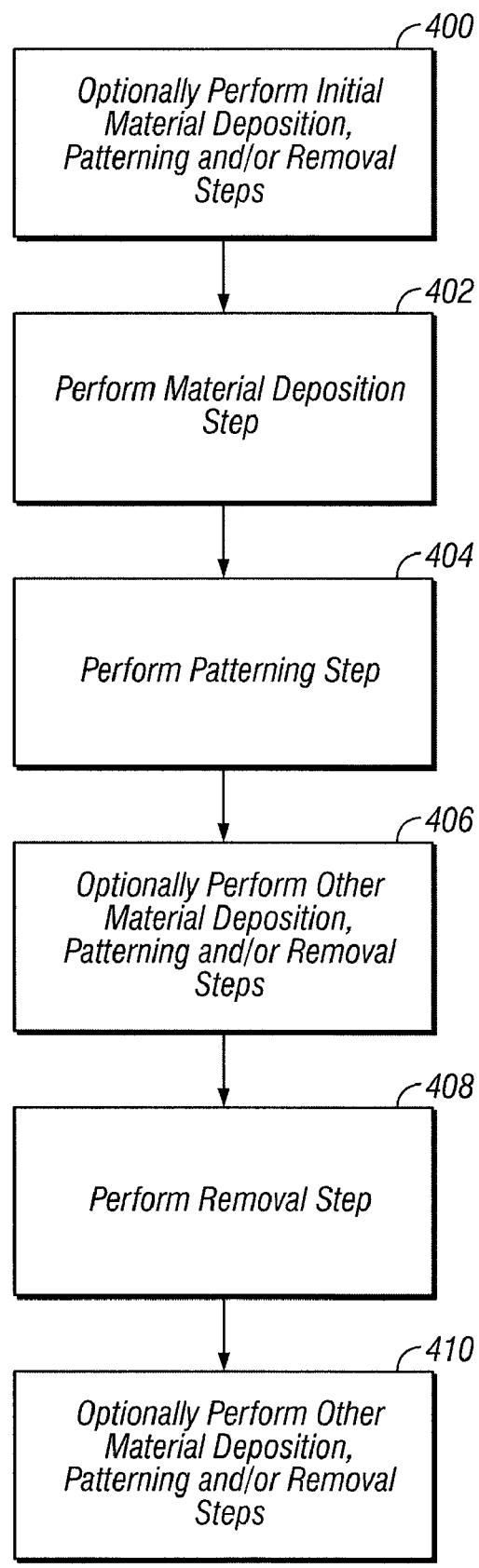
FIG. 7 depicts a flowchart of a process for manufacturing an iMoD display where at least one of the display's subpixels has a material not found in the other subpixels.
Figure 8:
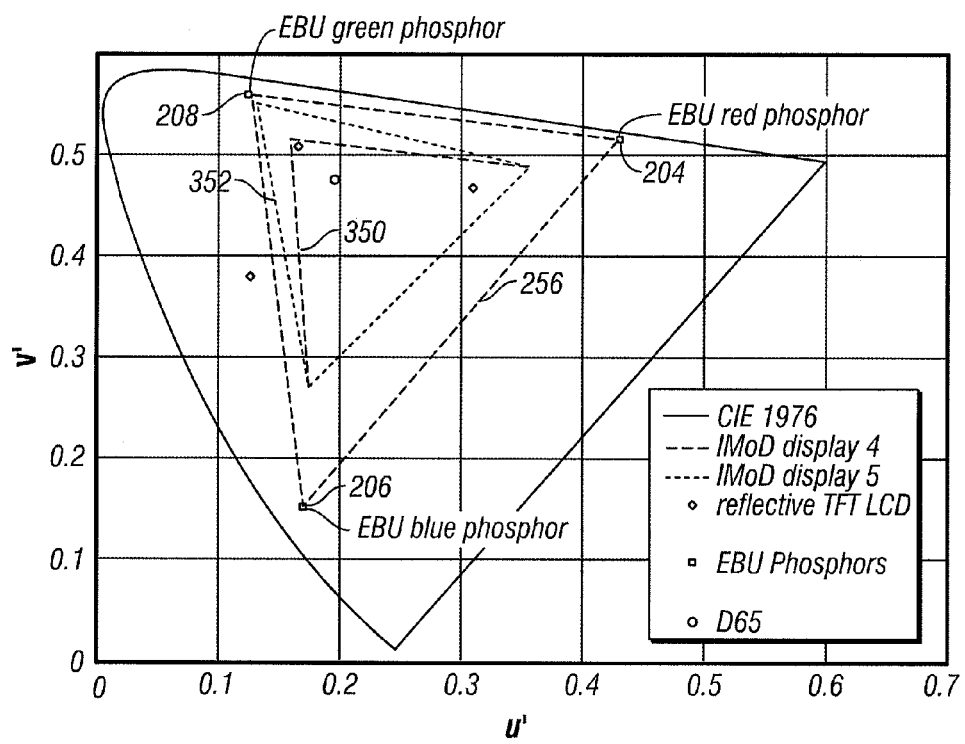
FIG. 8 shows a CIE color space plot of the color parameters and color gamut for two iMoD color displays having red subpixels constructed with a different material than the blue and green subpixels.

FIG. 7 depicts a flowchart of one embodiment of a process for manufacturing iMoD structures. In this embodiment, an iMoD display 100 such as in FIG. 2 is constructed where the pixels 102 have subpixels 104, 106, and 108 and at least one of the subpixels 104, 106, and 108 has a material not found in the other subpixels. In the first step 400, various initial material deposition, patterning, and/or removal steps are optionally performed during which the same structures and materials are created in all of the subpixels 104, 106, and 108. Next, at step 402, the material that is to be selectively included in at least one of the subpixels is deposited. In step 404, this materials is patterned such as by using lithography so that it can be selectively removed over some but not all of the subpixels. At step 406, other material deposition, patterning, and/or removal steps are optionally performed to all of the subpixels 104, 106, and 108. At step 408, a removal step is performed to selectively remove the material deposited in step 402 in the subpixels where the material is not to remain. In some embodiments, removal step 408 may also work to remove other material in some or all of the subpixels. Finally, in step 410, any additional material deposition, patterning, and/or removal steps are performed to all of the subpixels 104, 106, and 108.

The increased flexibility provided by modifying iMoD structures in choosing the primary colors for an iMoD display does not impact the design options available when choosing a brightness or color gamut level. FIG. 7 shows a CIE (u',v') color space plot depicting the color gamut of two iMoD displays. The two displays (iMoD display 4 and iMoD display 5) are illustrated by triangles in the CIE color space plot where the (u',v') color parameters of the primary color subpixles for each display define the vertices of the triangles. Triangle 350 corresponds to iMoD display 4 and triangle 352 corresponds to iMoD display 5. The blue and green subpixels of the two displays were constructed using iMoD structures 170 while the red subpixles were constructed using iMoD structures 180. The color gamut generated by EBU red 204, blue 206, and green 208 phosphors is also represented by triangle 256.

Table 2 lists various image quality parameters for iMoD display 4 350 and iMoD display 5 352. As in Table 1, the reflectance ratio, defined as the percent of light reflected from the display, provides an indication of the relative brightness of the displays. The contrast ratio indicates the contrast between bright and dark reflection. The color gamut for the three displays is expressed as a percent of the color gamut generated when using EBU red 204, blue 206, and green 208. Table 2 also lists the (u',v') color parameters for the red, green, and blue subpixels chosen for iMoD display 4 350 and iMoD display 5 352 as well as the respective projected white color parameters. Table 2 demonstrates that iMoD display 4 350 has a reflectance ratio and contrast ratio comparable to iMoD display 1 250 in Table 1 while exhibiting a much higher color gamut. Similarly, iMoD display 5 352 exhibits a high color gamut with only modest decrease in reflectance ratio and contrast ratio. By replacing the red subpixel in iMoD displays 1, 2 and 3 with a subpixel constructed with an iMoD structure 180, the chromaticity of the red primary has dramatically shifted towards and beyond the hue of the red EBU phosphor in displays 4 350 and 5 352. This result provides an improved useful color gamut as the range of bright, accessible red hues is increased.

TABLE 2

Image quality parameters of iMoD displays 4 and 5, using iMoD structures A and B.

| Parameter | | | iMoD display 4 | iMoD display 5 |
|---|---|---|---|---|
| Reflectance ratio (%) | | | 30 | 24 |
| Contrast ratio (x:1) | | | 18 | 15 |
| Color gamut (% of EBU) | | | 39 | 50 |
| Pixel pitch (mm) | | | 0.231 | 0.231 |
| Color chromaticity | White | u' | 0.200 | 0.198 |
| | | v' | 0.469 | 0.469 |
| | Red | u' | 0.370 | 0.372 |
| | | v' | 0.469 | 0.496 |
| | Green | u' | 0.161 | 0.133 |
| | | v' | 0.522 | 0.555 |
| | Blue | u' | 0.179 | 0.178 |
| | | v' | 0.274 | 0.271 |

Table 3 details the image quality parameters for iMoD display 4 350 and iMoD display 5 352 in comparison with typical reflective and transflective TFT LCDs measured under conditions of diffuse illumination. Comparison of the image quality performance of iMoD displays 4 350 and 5 with typical conventional reflective or transflective LCDs shows dramatic differences. iMoD displays are capable of providing reflectance levels more than twice that of reflective TFT LCDs while simultaneously providing a larger color gamut. The more than doubling of the brightness of the display has a dramatic effect upon the usage model of reflective displays. iMoD reflective displays with their low power benefits can be easily read in poorly lit office space without the need for supplemental illumination. Furthermore, the increased efficiency of the iMoD display lowers the requisite luminance required of the supplemental illumination system for dark ambient reading. Power is saved both by the bi-stable nature of the iMoD display and by the minimal dependence upon supplemental illumination.

TABLE 3

Typical image quality parameters for reflective and transflective LC displays.

| Parameter | Reflective TFT LCD | Transflective TFT LCD in reflective mode | Transflective TFT LCD in emissive mode | iMoD display 4 | iMoD display 5 |
|---|---|---|---|---|---|
| Reflectance ratio (%) | 15 | <10 | NA | 30 | 24 |
| Contrast ratio (x:1) | 15 | 10 | NA | 18 | 14 |
| Color gamut (% of EBU) | 18 | 6 | 46 | 39 | 50 |
| Pixel pitch (mm) | 0.242 | 0.224 | 0.224 | 0.231 | 0.231 |

The iMoD displays also look favorable when compared with transflective LCDs. The nature of the transflective compromise necessitates the use of the backlight under all conditions except bright outdoor sunlight. While in this transmissive mode, the display is capable of providing a bright image with a large color gamut (~46% of the EBU color gamut). However, while in a purely reflective mode, the reflectance falls to 10% or less, while the color gamut falls to 6% of the EBU color gamut. Alternatively, iMoD display 5 352 is capable of providing a reflectance level greater than 20% and a color gamut of 50% of the EBU color gamut all the while in a purely reflective mode. Supplemental illumination in the case of the iMoD display can increase the color gamut of the display in a similar manner as for the transflective display.

Methods of Optimizing Displays

In some embodiments, methods are provided for optimizing color iMoD displays (such as display 100 in FIG. 2). As described in more detail above, the color reflected from a particular iMoD structure can be tuned by varying the materials making up the iMoD structure as well as selecting the interference gap in the iMoD structure. Thus, methods are provided that include individually selecting materials and gaps for each color subpixel (such as subpixels 104, 106, and 108 in FIG. 2) in an iMoD display. Such selections can be made based on modeling of interference properties and material spectral properties. In addition or alternatively, before complete iMoD displays are fabricated, initial image quality performance studies can be performed upon iMoD test structures. These structures can then provide the opportunity to optimize the iMoD structure and quantify the color performance of different iMoD designs.

Figure 9:
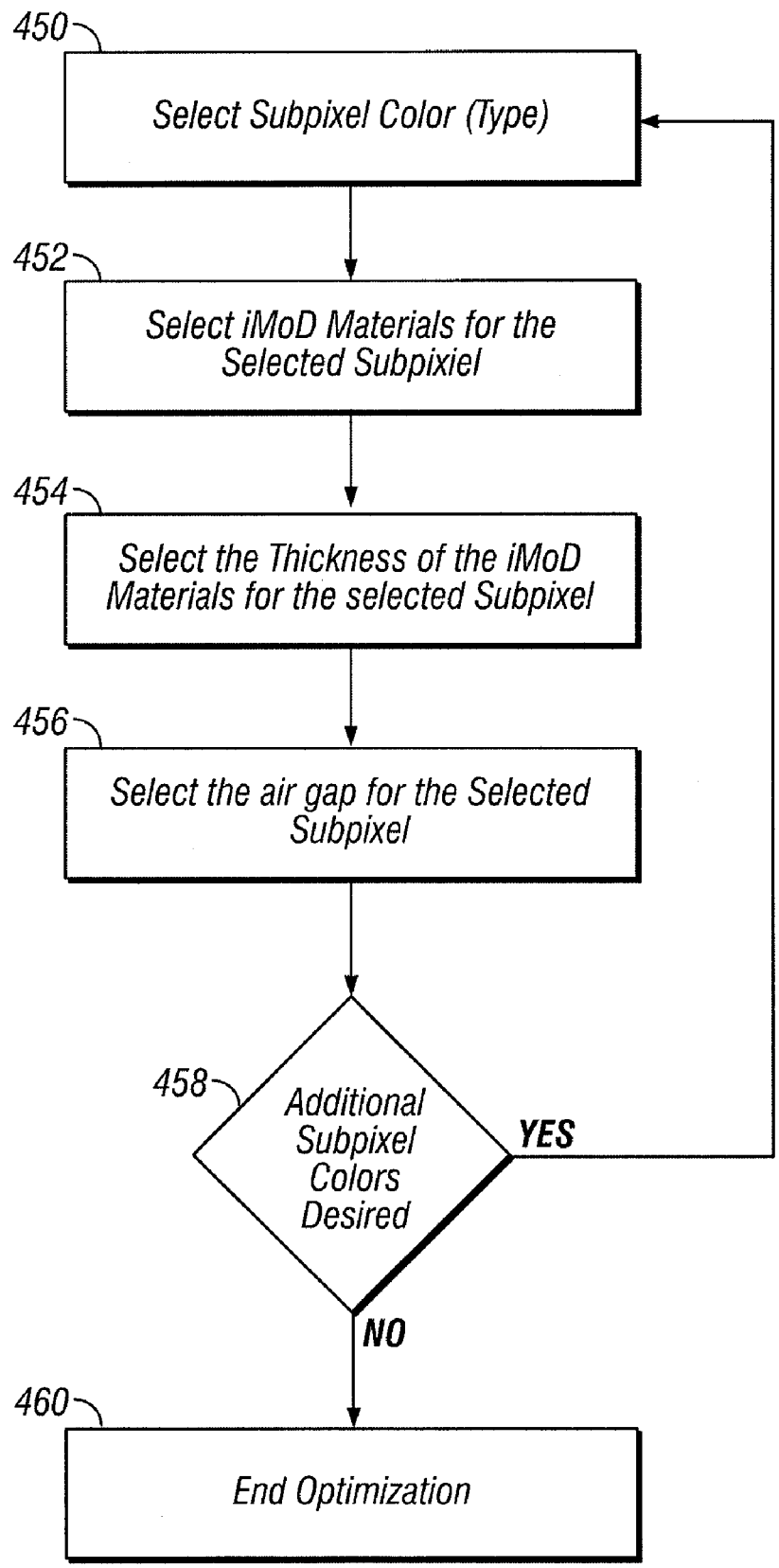
FIG. 9 depicts a flowchart of a process for separately optimizing each color subpixel in an iMoD display.

One embodiment of individually optimizing each color subpixel in an iMoD display is depicted in the flowchart of FIG. 9. At step 450, one of the desired subpixel colors is selected (e.g., red, green, or blue). At step 452, the materials to be used to construct the various elements in the iMoD for that subpixel are selected. These materials may be selected so as to optimize are particular characteristic of the color reflected from that subpixel (e.g., selecting gold for use in the movable mirror in iMoD structure B 180 in FIG. 3B). In step 454, the thickness of each material is chosen, keeping in mind the desired reflectance, contrast, and color characteristics for that color subpixel. In step 456, the air gap for the selected subpixel is determined based on the desired color characteristics for that subpixel. In decision step 458, it is determined if there are any other color subpixels that are to be included in the display and that have not yet been optimized. If so, the process returns to block 450 for optimization of that subpixel. If not, the process proceeds to block 460 for termination of the optimization.

What is claimed is:

1. A display, comprising:
    a plurality of pixels, each pixel comprising a plurality of subpixels in a same planar array, wherein each subpixel is selected from a plurality of subpixel types and each pixel includes at least two subpixels that are of differing subpixel type;
    wherein each subpixel type comprises an electromechanical device and is adapted to reflect light of a different color than other subpixel types; and
    wherein the electromechanical device in at least one subpixel type comprises a reflective layer that comprises gold or copper and the electromechanical device in the at least one other subpixel type does not comprise a reflective layer that comprises gold or copper.

2. The display of claim 1, wherein the reflective layer that comprises gold or copper is a movable mirror.

3. The display of claim 1, wherein the reflective layer that comprises gold or copper is a partial reflector.

4. The display of claim 1, wherein the display is a reflective display.

5. The display of claim 1, wherein the electromechanical devices are interference modulators.

* * * * *